O. WILLIAMS.
ANIMAL POKE.
APPLICATION FILED FEB. 27, 1915.
1,206,632.
Patented Nov. 28, 1916.
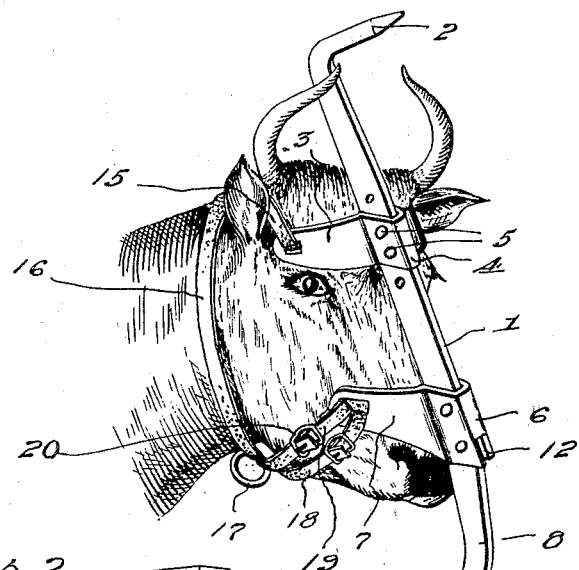
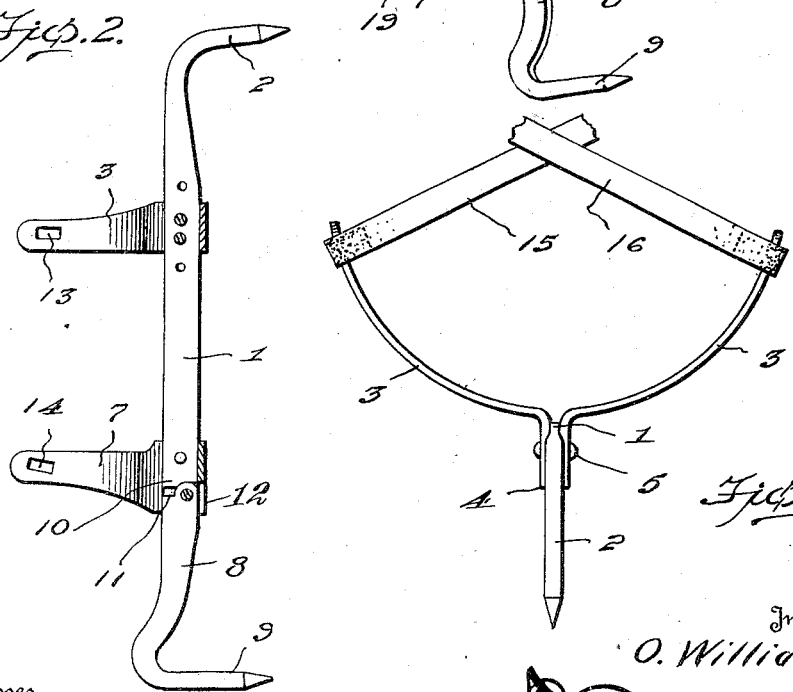

UNITED STATES PATENT OFFICE.

OSKER WILLIAMS, OF FORESTBURG, TEXAS, ASSIGNOR OF ONE-HALF TO J. L. ROMINES, OF FORESTBURG, TEXAS.

ANIMAL-POKE.

1,206,632.  Specification of Letters Patent.  Patented Nov. 28, 1916.

Application filed February 27, 1915. Serial No. 11,002.

*To all whom it may concern:*

Be it known that I, OSKER WILLIAMS, a citizen of the United States, residing at Forestburg, in the county of Montague and State of Texas, have invented certain new and useful Improvements in Animal-Pokes; and I do hereby declare the following to be a full, clear, and exact description of the invention, such as will enable others skilled in the art to which it appertains to make and use the same.

This invention relates to animal pokes and the primary object of the invention is to provide a poke for attachment to the head of an animal, such as a cow, horse, or the like, which will prevent the animal from getting under, over or through fences, slackening bent wires, or prevent them from otherwise damaging or mutilating fences of all kinds.

Another object of this invention is to provide an animal poke as specified, which will prevent cattle from eating stacked feed, and also one which may be employed for weaning calves, if it is so desired.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a perspective view of the improved animal poke, showing the same attached to the head of a cow, Fig. 2 is a side elevation partially in section of the animal poke, Fig. 3 is a top plan view of the poke.

Referring more particularly to the drawings, 1 designates a face bar of the animal poke, which is substantially rectangular in cross section and is provided for having one of its edges lying in engagement with the face of the cow or other animal, and extending along the face, from the nose to the top of the face or head and upwardly therefrom. The face bar 1 has its upper end 2 reduced and bent substantially at right angles to the main body of the face bar, extending forwardly therefrom and being sharpened, as is clearly shown in Figs. 1 and 2 of the drawing. The face bar 2 has a brow band 3 secured thereto, downwardly from the upper angled end 2. The brow band 3 is bent intermediate its ends to form a substantially U-shaped section 4, which engages the face bar 1 and is securely attached thereto by means of rivets or other suitable fastening means 5.

The face bar 1 has its lower end inserted in and secured to the U-shaped section 6 of the nose band 7. The nose band 7, like the brow band 3, is preferably constructed of sheet metal, curved to conform to the configuration of the face of the animal upon which the poke is to be placed. The nose band 7 has pivotally connected to the U-shaped section 6 thereof, a depending guard 8, which extends downwardly from the lower edge of the nose band substantially in alinement with the face bar 1. The pivoted guard 8 has its lower end bent substantially at right angles thereto and sharpened, as is shown at 9. The face bar 1 has a depending lug 10 formed upon its lower end, which is provided for engaging a shoulder 11 formed upon the upper end of the pivoted guard 8, for preventing rearward pivotal movement of the guard, toward the animal's head. The U-shaped section 6 of the nose band 7 is cut away, as is shown at 12, so as to permit of a forward movement of the guard 8, so as to allow the animal to graze when wearing the poke.

The brow band 3 and the nose band 7 are provided with openings 13 and 14 formed in their ends. Flexible straps 15 and 16 are secured to the ends of the brow band.

The flexible straps 15 and 16 extend upwardly from the ends of the brow band 3 and are crossed, over the top of the animal's head, extending downwardly behind the rear edges of the animal's cheeks, and passed through a guide ring 17. The guide ring 17 is carried by the under jaw strap 18. The ends of the flexible members or straps 15 and 16, which form a throat latch, when extending around the neck of the animal, are connected to short lengths 19 of straps, or flexible members, which are secured to the ends of the nose band 7. The straps 15 and 16 are connected to the straps 19 adjustably, by means of buckles or like adjustable fastening devices indicated at 20. The under jaw strap 18 is secured to one end of the nose band 7 and extends rearwardly under the jaw of the animal, being secured to the opposite end of the nose band 7, for securely holding the poke positioned upon the animal's face. The ends of the nose band 7 extend along the sides of the animal's face, for positioning the jaw strap 18 so as to permit of free and unimpeded jaw movement of the animal while grazing.

In reducing the invention to practice, certain minor features of construction, combination and arrangement of parts may necessitate alterations to which the patentee is entitled provided such alterations are comprehended within the scope of what is claimed.

What is claimed is:—

In an animal poke structure, a face bar, a transversely extending prong formed upon the upper end of said face bar, a metallic nose band secured to the lower end of said face bar and having a portion thereof cut away, a guard pivotally connected to said nose band, the cut away portion of said nose band permitting of a limited forward pivotal movement of said guard, a shoulder formed upon the pivoted end of said guard, a lug carried by said face bar and provided for engagement with said pivoted guard for preventing rearward pivotal movement of the guard with respect to the face bar.

In testimony whereof I affix my signature in presence of two witnesses.

OSKER WILLIAMS.

Witnesses:
L. M. GARDNER,
L. E. PETTY.

Copies of this patent may be obtained for five cents each, by addressing the "Commissioner of Patents, Washington, D. C."